UNITED STATES PATENT OFFICE.

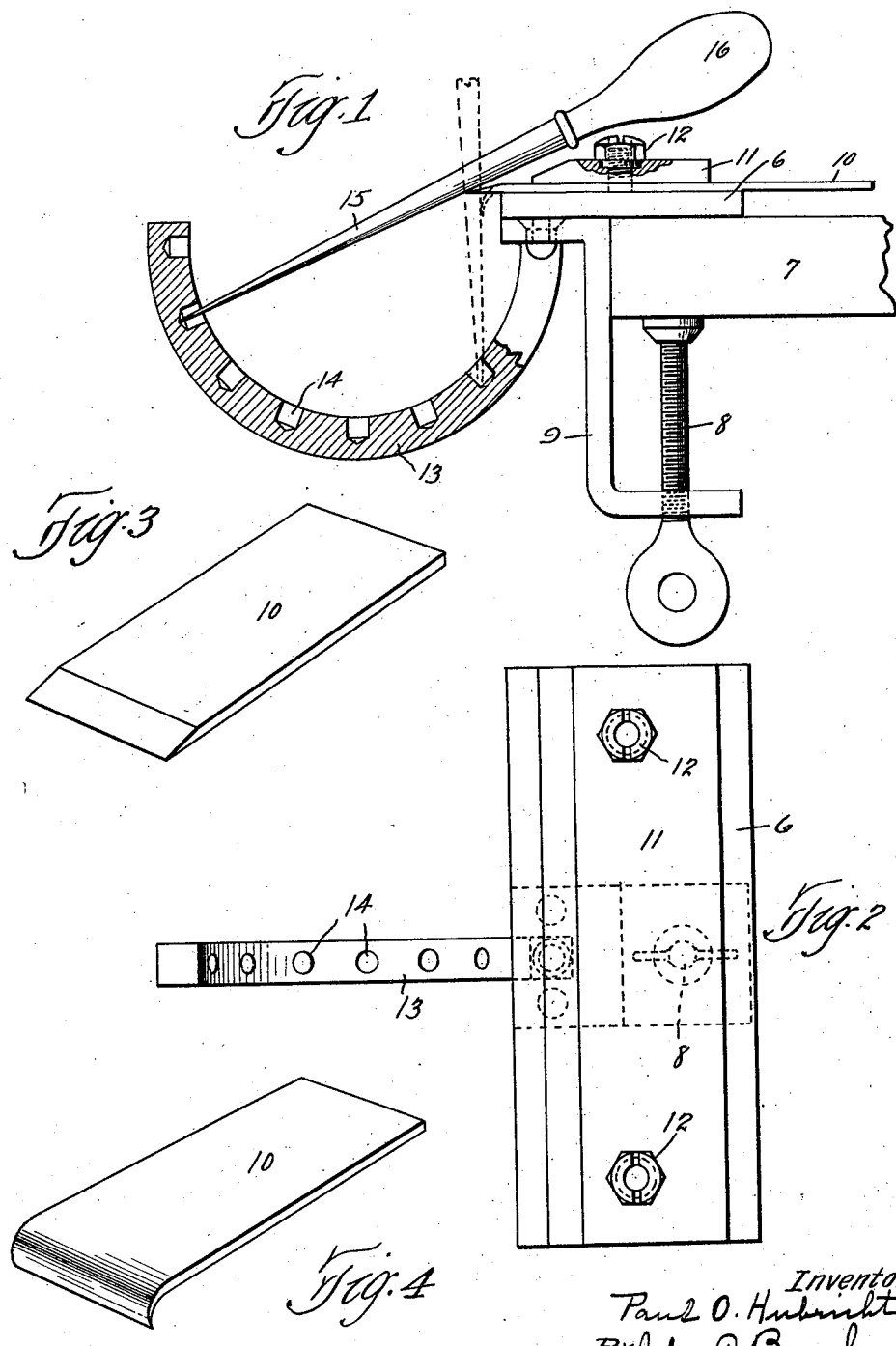

PAUL O. HUBRICHT, OF CLEVELAND, OHIO.

HOLDING-TOOL FOR SHARPENING SCRAPERS, &c.

1,400,065.    Specification of Letters Patent.    Patented Dec. 13, 1921.

Application filed October 20, 1920. Serial No. 418,276.

*To all whom it may concern:*

Be it known that I, PAUL O. HUBRICHT, a citizen of the United States, residing at Cleveland, in the county of Cuyahoga and State of Ohio, have invented certain new and useful Improvements in Holding-Tools for Sharpening Scrapers, &c., of which the following is a specification.

This invention relates to devices for holding scraper or other blades while they are being sharpened, the blades referred to being such as are ordinarily used on wood scrapers, although the device is capable of use with other blades such as those of chisels, scissors and cutting implements generally.

The device comprises a clamp for holding the work, and a guide or support for the tool, such as a burnisher or file, which is used to sharpen the blade, the purpose of the guide or holder for the tool being to produce a correct angle or bevel on the cutting edge of the blade, the guide or holder permitting an adjustment of the tool to various angles.

In the accompanying drawings Figure 1 is a side elevation, partly in section, of the device. Fig. 2 is a top plan. Figs. 3 and 4 are perspectives of scraper blades which may be sharpened by use of the device.

The holder for the blade or work has a base plate 6 which may be attached to the edge of a bench 7 by an ordinary screw clamp 8, the arm 9 of which is fixed to the under side of the plate 6 and is offset at its lower end to project under the bench. The blade 10, to be sharpened, is clamped to the base plate 6 by means of a top plate 11 and screws 12, the dimensions of the parts being such that blades of various widths or thicknesses may be held, in such manner that the edge of the blade to be sharpened will project somewhat in front of the plate 6.

Attached to the under side of the plate 6 near the front edge thereof, is a semicircular guide arm and rest 13, which is provided on its inner or upper surface with a plurality of holes or depressions 14 spaced apart along said surface. These holes indicate different angles with respect to the edge of the blade being sharpened and are adapted to receive the front end of a burnisher 15 or the like, with the body of the burnisher resting against the edge of the blade to be sharpened, and the handle 16 thereof extending in convenient position to be moved back and forth along the edge of the blade.

In the use of the device the blade will be clamped in the holder, and the point or front end of the burnisher will be placed in the hole 14 corresponding to the bevel of the edge to be sharpened, and then by swinging the burnisher back and forth the full length of the edge of the blade may be acted on by the burnisher. Fig. 1 shows in full lines the manner of use of the device on a straight blade or scraper, such as shown in Fig. 3, and shows in dotted lines the location of the burnisher when sharpening a hooked scraper as illustrated in Fig. 4. The semicircular shape of the rest 13, and the plurality of holes 14, permits an accommodation for practically all bevels from a vertical to almost a horizontal. And so the device is capable of use with very thin or acutely beveled edges, as well as more obtuse or angular ones. The ordinary hand operation of a sharpening tool to angle or bevel is more or less uncertain or dependent upon the skill of the operator, but by the use of the device disclosed the bevel is made regular and certain along the complete edge of the blade, the slight variation incident to the angular swing of the burnisher or file being negligible.

I claim:

A work holder for sharpening blades, comprising a horizontally arranged clamp for the blade, a screw clamp depending from the under side of said clamp, for the attachment of said clamp to the edge of a bench or the like, and a curved arm secured to the under side of the blade clamp and projecting outwardly therefrom, and having a plurality of depressions located at various angles with respect to the blade clamp and adapted to form a rest for the front end of a tool while it is being applied to the edge of the blade.

In testimony whereof, I affix my signature in presence of two witnesses.

PAUL O. HUBRICHT.

Witnesses:
JOHN A. BOMMHARDT,
G. MOSENBERG.